(12) United States Patent  
Saha et al.

(10) Patent No.: US 9,391,843 B1  
(45) Date of Patent: Jul. 12, 2016

(54) PRE-COMPUTING EFFECTS OF MODIFYING COMPONENTS IN A DATA CENTER SWITCH

(71) Applicant: Juniper Networks, Inc., Sunnyvale, CA (US)

(72) Inventors: Amit Kumar Saha, Sunnyvale, CA (US); Rajeev Batni, Cupertino, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 576 days.

(21) Appl. No.: 13/732,139

(22) Filed: Dec. 31, 2012

(51) Int. Cl.  
*H04L 12/28* (2006.01)  
*H04L 12/24* (2006.01)

(52) U.S. Cl.  
CPC ..................................... *H04L 41/12* (2013.01)

(58) Field of Classification Search  
CPC ......... H04L 41/12; H04L 12/00; H04L 43/00; H04W 40/24; H04W 40/34  
USPC .......................................................... 370/255  
See application file for complete search history.

(56) References Cited

U.S. PATENT DOCUMENTS

| | | | | |
|---|---|---|---|---|
| 8,942,232 | B1 * | 1/2015 | Fermor et al. | 370/388 |
| 2007/0038748 | A1 * | 2/2007 | Masuyama | 709/225 |
| 2007/0070919 | A1 * | 3/2007 | Tanaka et al. | 370/254 |
| 2009/0177878 | A1 * | 7/2009 | Gao et al. | 713/100 |
| 2011/0080829 | A1 * | 4/2011 | Breslin et al. | 370/235 |
| 2011/0205933 | A1 * | 8/2011 | Porat | 370/254 |
| 2012/0155511 | A1 * | 6/2012 | Shaffer et al. | 375/133 |
| 2013/0188514 | A1 * | 7/2013 | Jain | 370/254 |

OTHER PUBLICATIONS

Harrington et al., RFC 3411, "An Architecture for Describing Simple Network Management Protocol (SNMP) Management Frameworks," Network Working Group, the Internet Engineering Task Force draft, Dec. 2002, available at <http://tools.ietf.org/html/rfc3411>, 65 pgs.  
U.S. Appl. No. 12/960,147, "Automatic Class of Service Provisioning for Data Transfer Within a Data Center," filed Dec. 3, 2011.

* cited by examiner

*Primary Examiner* — Peter Cheng  
*Assistant Examiner* — Ellen A Kirillova  
(74) *Attorney, Agent, or Firm* — Shumaker & Sieffert, P.A.

(57) ABSTRACT

The disclosure describes techniques to pre-compute the effect of modifying components in a data center switch prior to actually modifying the components. A data center analyzer is configured to discover the topology of the switch and present an editable version of the topology to a data center administrator. The data center analyzer receives proposed modifications to the current topology, including removed, replaced or updated components, and applies a non-distributed copy of the traffic distribution algorithm to the modified topology to compute an expected traffic distribution and traffic metrics. The administrator may then determine whether to modify the components based on the expected traffic distribution and associated traffic metrics. When the administrator allows modification of the components, the data center analyzer may compute and install alternative routing paths for components in the data center switch to minimize data loss due to the modified components.

30 Claims, 5 Drawing Sheets

PRE-COMPUTING EFFECTS OF MODIFYING COMPONENTS IN A DATA CENTER SWITCH

TECHNICAL FIELD

The invention relates to computer networks and, more particularly, to techniques for configuring and managing network devices.

BACKGROUND

A data center is a specialized facility that houses web sites and provides data serving and backup as well as other network-based services for subscribers. A data center in its most simple form may consist of a single facility that hosts all of the infrastructure equipment, such as networking and storage systems, redundant power supplies, and environmental controls. More sophisticated data centers are normally organizations spread throughout the world with subscriber support equipment located in various physical hosting facilities.

A data center switching architecture is used to provide subscribers and applications used by the subscribers with access to the web sites, data, and services housed in the data center. In some examples, the data center switching architecture comprises a multi-tiered architecture in which two or three tiers of Layer 2 switches are interconnected to aggregate data center traffic from servers and other devices in the data center to Layer 3 routers that communicate with other data centers or external networks.

In other examples, the data center switching architecture may be flattened into a single tier of distributed access switches directly connected to one another across a fabric backplane to transmit traffic directly between servers, routers, and other devices connected to the access switches. The single tier fabric architecture can be managed as a single data center switch with distributed data and control planes across the components in the switch and a centralized management system. In this case, however, the highly distributed and interconnected fabric architecture makes it difficult to predict the effect of removing, replacing or updating components in the data center switch.

SUMMARY

In general, the disclosure describes techniques to pre-compute the effect of modifying components in a data center switch prior to actually modifying the components. A data center analyzer is configured to discover the topology of the switch and present an editable version of the topology to a data center administrator. The data center analyzer receives proposed modifications to the current topology, including removed, replaced or updated components, and applies a non-distributed copy of the traffic distribution algorithm to the modified topology to compute an expected traffic distribution and traffic metrics. The administrator may then determine whether to modify the components based on the expected traffic distribution and associated traffic metrics.

In some cases, when the administrator allows modification of the components, the data center analyzer may compute alternative routing paths between affected components in the data center switch to minimize data loss due to the removed, replaced or updated components. The data center analyzer then installs the alternate routing paths in relevant components of the data center switch and updates the traffic distribution state in the data center switch. In this way, after installation of the alternative routing paths, the data center switch has an operational state that ignores any components that were removed from the switch and recognizes any components that were replaced or updated.

In one example, this disclosure is directed toward a method comprising receiving, with a data center analyzer connected to a centralized management system of a data center switch, proposed modifications to a current topology of the data center switch, wherein the proposed modifications to the current topology comprise proposed modifications to one or more components included in the data center switch. The method comprises computing an expected traffic distribution across connections of the components in the modified topology of the data center switch based on a traffic distribution algorithm and the modified topology, and sending the expected traffic distribution to an administrator for a decision whether to allow the proposed modifications to the components in the data center switch.

In another example, this disclosure is directed toward a network device comprising a connection to a centralized management system for a data center switch, and a processor configured to execute a data center analyzer to receive proposed modifications to a current topology of the data center switch. The proposed modifications to the current topology comprise proposed modifications to one or more components included in the data center switch. The processor is configured to compute an expected traffic distribution across connections of the components in the modified topology of the data center switch based on a traffic distribution algorithm and the modified topology, and send the expected traffic distribution to an administrator for a decision whether to allow the proposed modifications to the components in the data center switch.

In a further example, this disclosure is directed to a computer-readable storage medium comprising instructions that when executed cause one or more processors to receive proposed modifications to a current topology of a data center switch, wherein the proposed modifications to the current topology comprise proposed modifications to one or more components included in the data center switch. The instructions further cause the processor to compute an expected traffic distribution across connections of the components in the modified topology based on a traffic distribution algorithm and the modified topology, and send the expected traffic distribution to an administrator for a decision whether to allow the proposed modifications to the components in the data center switch.

In another example, this disclosure is directed to a system comprising a data center switch including one or more components and a centralized management system, and a data center analyzer connected to the centralized management system for the data center switch. The data center analyzer is configured to receive proposed modifications to a current topology of the data center switch, wherein the proposed modifications to the current topology comprise proposed modifications to the components included in the data center switch. The data center analyzer is further configured to compute an expected traffic distribution across connections of the components in a modified topology of the data center switch based on a traffic distribution algorithm and the proposed modifications, and send the expected traffic distribution to an administrator for a decision whether to allow the proposed modifications to the components in the data center switch.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
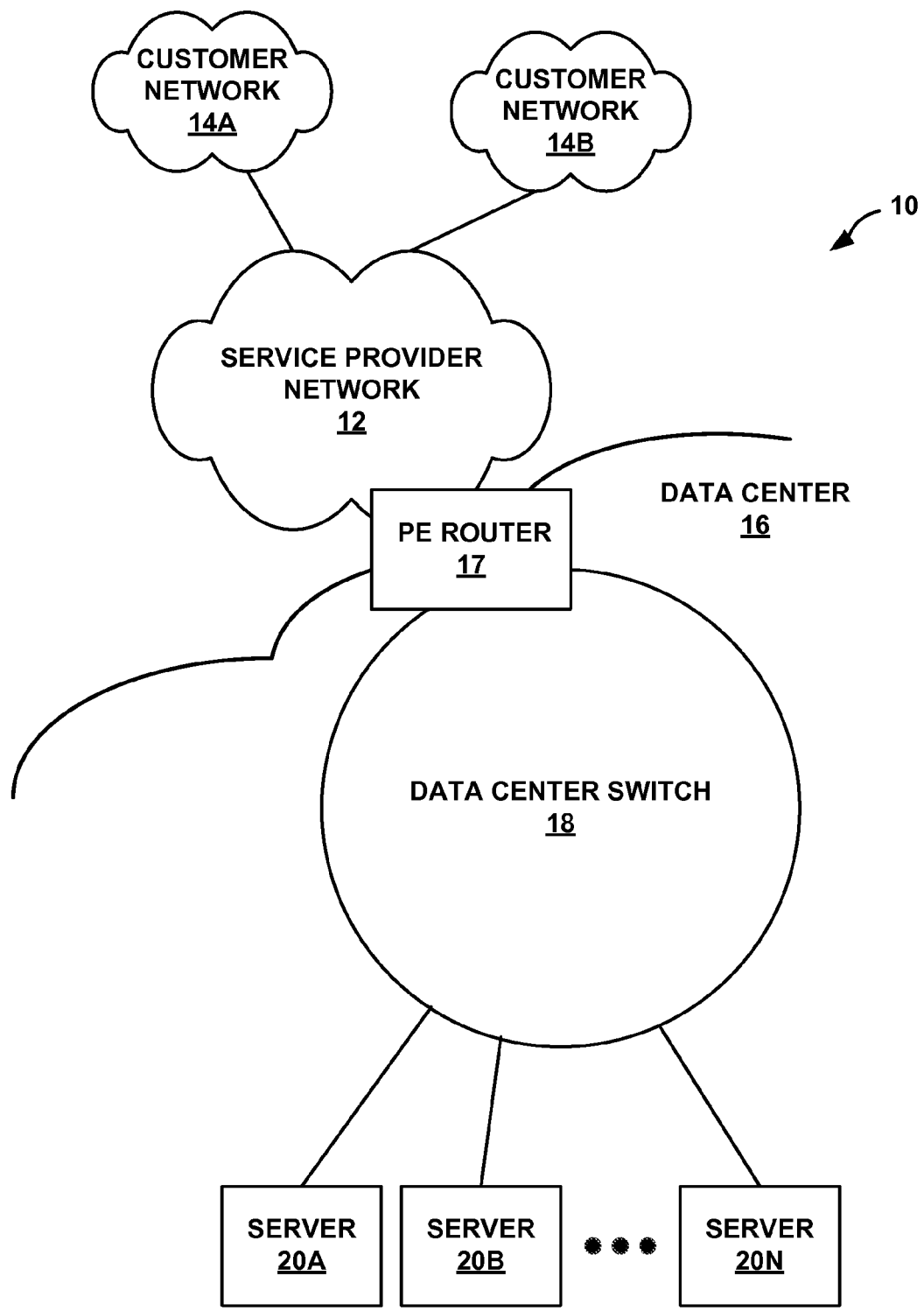
FIG. 1 is a block diagram illustrating an example network system including a data center with servers and a data center switch configured to provide connectivity between the servers and a service provider network.

FIG. 1 is a block diagram illustrating an example network system 10 including a data center 16 with servers 20A-20N ("servers 20") and a data center switch 18 configured to provide servers 20 with access to a service provider network 12. Service provider network 12, in turn, provides customer networks 14A-14B ("customer networks 14") with access to web sites, data and services housed in servers 20. According to the techniques described in this disclosure, data center switch 18 includes a data center analyzer configured to pre-compute the effect of modifying components in data center switch 18 prior to actually modifying the components.

Data center 16 is a facility that, in some examples, houses web sites and provides data serving and backup as well as other network-based services for end users in customer networks 14. A data center in its most simple form may consist of a single facility that hosts all of the infrastructure equipment, such as networking and storage systems, redundant power supplies, and environmental controls. More sophisticated data centers are normally organizations spread throughout the world with subscriber support equipment located in various physical hosting facilities.

In some examples, data center 16 may represent one of many geographically distributed network data centers. As illustrated in the example of FIG. 1, data center 16 may be a facility that includes servers 20 to provide resources for customer networks 14. Customer networks 14 may be collective entities such as enterprises and governments or individuals. For example, data center 16 could house web servers for several small businesses. Other exemplary services may include data storage, virtual private networks, traffic engineering, file service, data mining, scientific- or super-computing, and so on. In some embodiments, data center 16 may include individual network servers, network peers, or otherwise.

Service provider network 12 may be coupled to one or more networks (not shown) administered by other providers, and may thus form part of a large-scale public network infrastructure, e.g., the Internet. Service provider network 12, therefore, may provide end users in customer networks 14 with access to the Internet. In addition, service provider network 12 may provide data center 16 with access to the Internet, and may allow servers 20 within data center 16 to communicate with each other. Provider edge (PE) router 17 performs Layer 3 routing to route network traffic between data center 16 and customer networks 14 using service provider network 12. Service provider network 12 may include a variety of network devices other than PE router 17, such as other PE routers, core routers, customer edge (CE) routers, and switches.

Although additional network devices are not shown for ease of explanation, it should be understood that network system 10 may comprise additional networks and/or data centers including, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Moreover, although the elements of network system 10 are illustrated as being directly coupled, it should be understood that one or more additional network elements may be included along any links between service provider network 12 and customer networks 14 and any links between data center switch 18 and servers 20, such that the network elements of computer system 10 are not directly coupled Data center 16 includes data center switch 18 to connect servers 20 to service provider network 12 via PE router 17. Data center switch 18 may include a plurality of top-of-rack (TOR) switches interconnected via one or more distribution or core switches. In some examples, the architecture of data center switch 18 comprises a multi-tiered architecture in which two or three tiers of TOR switches and core switches are interconnected to aggregate data center traffic from servers 20 included in data center 16 to PE router 17 that communicates with service provider network 12 and/or other data centers.

In other examples, the architecture of data center switch 18 may be flattened into a single tier of distributed TOR switches directly connected to one another across a fabric backplane of distribution switches to transmit traffic directly between servers 20 and PE router 17 connected to the TOR switches. In the example of the single tier fabric architecture, data center switch 18 can be managed as a single switch with distributed data and control planes across the components in data center switch 18 and a centralized management system. In this case, however, the highly distributed and interconnected fabric architecture makes it difficult to predict the effect of removing, replacing or updating components in data center switch 18.

According to the techniques described in this disclosure, data center switch 18 includes a data center analyzer (not shown in FIG. 1) configured to pre-compute the effect of modifying components in data center switch 18 prior to actually modifying the components. The data center analyzer operating within a management plane of data center switch 18 is configured to automatically discover the topology of data center switch 18 and present an editable version of the topology to a data center administrator. The data center analyzer receives proposed modifications to the current topology, including removed, replaced or updated components, and applies a non-distributed copy of the traffic distribution algorithm to the modified topology to compute an expected traffic distribution and traffic metrics. The administrator may then determine whether to modify the components based on the expected traffic distribution and associated traffic metrics.

Data center switch 18 is generally described in this disclosure as conforming to the single tier fabric architecture including the data center analyzer executed by a network device within the centralized management system. This example architecture of data center switch 18 is described in more detail with respect to FIGS. 2-4. In other examples, however, data center switch 18 may conform to a different architecture, such a multi-tiered architecture or a different type of single tier architecture, and may or may not include the data center analyzer as part of data center switch 18. In some cases, the data center analyzer as described in this disclosure may be executed by a network device external to data center switch 18 with connectivity to the management system of data center switch 18.

Figure 2:
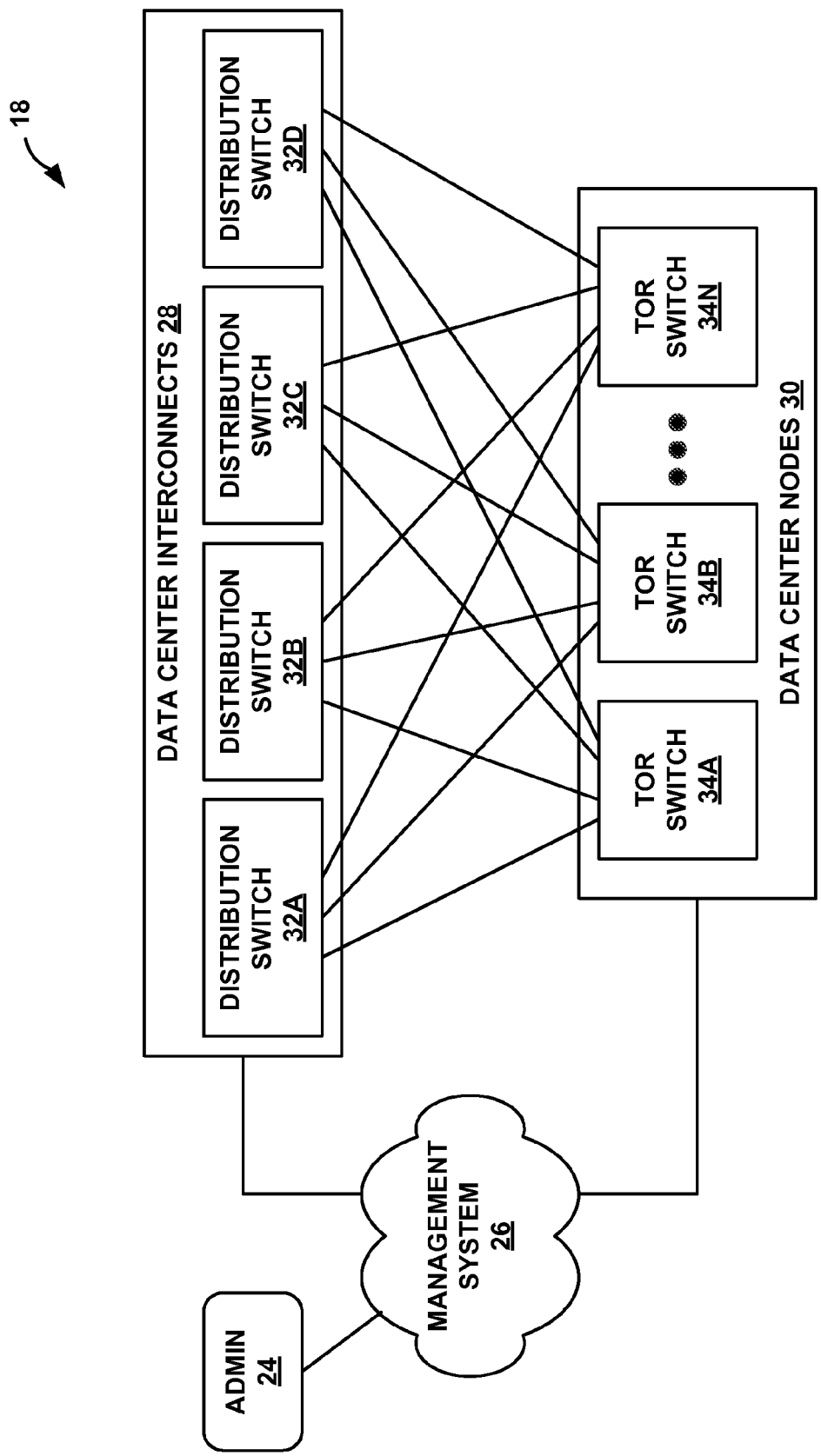
FIG. 2 is a block diagram illustrating an example of a data center switch including a centralized management system configured to manage components of the data center switch.

FIG. 2 is a block diagram illustrating an example of data center switch 18 including a centralized management system 26 configured to manage components of data center switch 18. Data center switch 18 conforms to a single tier fabric architecture that comprises a massively distributed system including up to hundreds of components. The architecture illustrated in FIG. 2 is merely exemplary and, in other examples, data center switch 18 may conform to a different architecture.

In the illustrated example, an administrator 24 interacts with components of data center switch 18 via centralized management system 26. Administrator 24 may comprise an individual, a team of individuals, an automated computer system or a semi-automated computer system. In some cases, administrator 24 may purely be a data center administrator responsible for configuration and monitoring of components in data center switch 18. In other cases, administrator 24 may also be a database administrator or a network administrator responsible for configuration and monitoring of routers, switches, servers, and other network devices external to data center switch 18.

In the example of FIG. 2, data center switch 18 includes data center nodes 30 interconnected via data center interconnects 28. Data center nodes 30 may comprise a plurality of top-of-rack (TOR) switches 34A-34N ("TOR switches 34"). Data center interconnects 28 may comprise multiple distribution switches 32A-32D ("distribution switches 32"). In one example, in its full scale, data center switch 18 may include at least two director group nodes within management system 26, up to 128 TOR switches 34, up to four distribution switches 32, each containing up to eight front cards and two control boards, and up to two virtual chassis, each containing up to four control switches, to generate an out-of-band control plane network.

TOR switches 34 form the access layer of data center switch 18 and provide networks devices, such as PE router 17 and servers 20 from FIG. 1, with access to the internal switch fabric of data center switch 18. The network devices may be connected to TOR switches 34 via a Gigabit Ethernet connection. TOR switches 34 may provide layer 2 (MAC address) and/or layer 3 (IP address) switching functionality between the network devices.

In the illustrated example, each of TOR switches 34 is directly connected to each of distribution switches 32. Distribution switches 32 comprise the fabric interconnect backbone of data center switch 18 by providing layer 2 switching functionality to transfer data between connections of TOR switches 34. More specifically, each of distribution switches 32 includes front cards with multiple ports to receive and send data with TOR switches 34, and rear cards to transfer data between the front card ports. Distribution switches 32 may be connected to TOR switches 34 via a Gigabit Ethernet connection. Data en route from one network device to another, e.g., from PE router 17 to server 20A, may pass through one or more of TOR switches 34 and one or more of distribution switches 32.

TOR switches 34 and distribution switches 32 include one or more processors capable of executing one or more software processes. For example, each of TOR switches 34 and distribution switches 32 may include a control unit and one or more packet forwarding engines (PFEs) (also referred to as "forwarding units"). The PFEs may be configured to switch packets from an input interface to an output interface of the switch using a switch fabric internal to the switch. For example, when TOR switch 34A receives a packet, an ingress PFE performs a lookup using forwarding information and forwards the network packet across an internal switch fabric of TOR switch 34A to an egress PFE of the switch. The egress PFE then forwards the network packet to a "next hop" device, which may be one of distribution switches 32 within data center switch 34A or a network device outside of data center switch 18 that is communicatively coupled to TOR switch 34A.

The single tier fabric architecture of data center switch 18 illustrated in FIG. 2 provides a highly distributed and interconnected system of switches that can be viewed by administrator 24 as a single switch. To achieve this, data center switch 18 includes data and control planes distributed across all components of switch 18, and centralized management system 26 through which administrator 24 can interact with any of the components of switch 18. More specifically, the routing and forwarding functionality of data center switch 18 is distributed across all TOR switches 34. For example, each of TOR switches 34 may perform routing operations by discovering its neighboring switches by sending hello messages, link state messages, broadcast messages or other routing protocol communications on each of its links to distribution switches 32. In addition, each of TOR switches 34 may execute a traffic distribution algorithm to determine traffic distribution across its links based on the discovered neighboring switches. In some cases, TOR switches 34 may share its routing information and traffic distribution with other components of data center switch 18 via the distributed control plane.

In order for administrator 24 to view the components of data center switch 18 as a single switch, the management and configuration processes for the components are centralized in management system 26. As illustrated in FIG. 2, management system 26 is connected to each of TOR switches 34 and distribution switches 32. In this way, administrator 24 can interact with any of the components in data center switch 18 to monitor, configure, or otherwise manage the components. For example, management system 26 may provide command line interface (CLI), simple network management protocol (SNMP), and system log functionality into data center switch 18 for administrator 24.

For example, TOR switches 34 or distribution switches 32 may receive network messages from management system 26 via SNMP. Upon receiving a network message, the managed component may provide information based on a monitoring request in the network message or modify its current configuration based on configuration data in the network message. For example, the monitoring request may ask the managed component to report its connectivity to other switches in data center switch 18 and/or the traffic distribution across its links. As another example, the configuration data may comprise a request to perform an update of the managed component.

Many of TOR switches 34 and distribution switches 32 may comprise field replaceable units (FRUs) that may be removed, replaced, updated or otherwise modified by administrator 24. Whenever a component of data center switch 18 needs to be modified, however, there is potential of affecting ongoing traffic through data center switch 18. From a deployment perspective, it would be invaluable to be able to precompute the effect of modifying one or several of the components prior to actually modifying the components. In addition, it would be similarly invaluable to be able to use the pre-computed information to compute and install alternate routing paths in the data center switch to minimize traffic disruption.

Generally, the effect of modifying components may be pre-computed in a very naive fashion by estimating the number of links that will be affected by the modification of the components and attempting to correlate the number of affected links with loss of capacity and other traffic metrics. One example technique described in this disclosure performs an exact computation to determine the effect of modifying components in data center switch 18 prior to actually making the modifications. According to the techniques described in this disclosure, management system 26 includes a data center analyzer (not shown in FIG. 2) configured to pre-compute the effect of modifying components in data center switch 18 prior to actually modifying the components. The operation of the data center analyzer is described in more detail below with respect to FIGS. 3 and 4.

Figure 3:
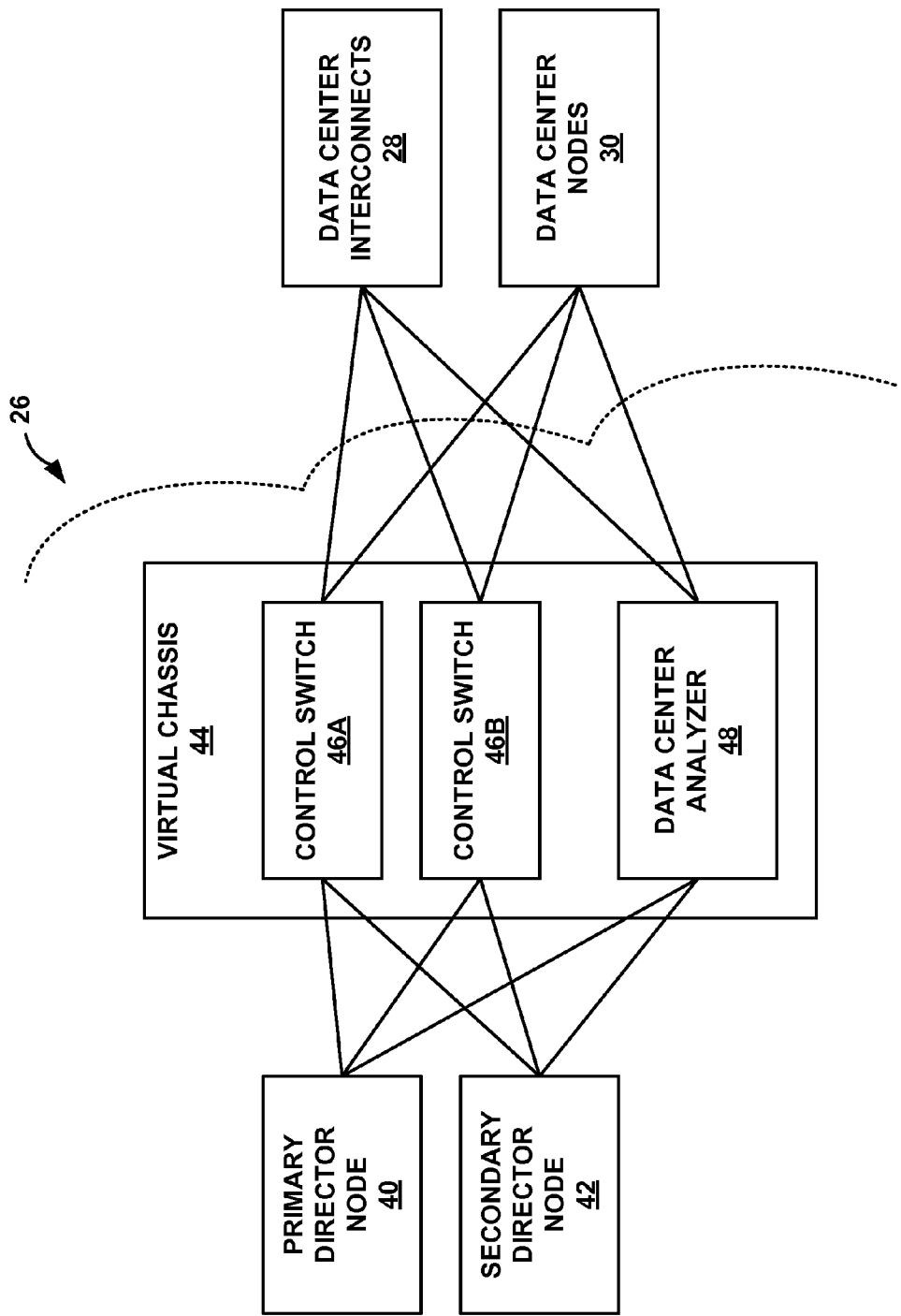
FIG. 3 is a block diagram further illustrating the management system from FIG. 2 including a data center analyzer configured to pre-compute the effect of modifying components in the data center switch prior to actually modifying the components.

FIG. 3 is a block diagram illustrating one example of centralized management system 26 from FIG. 2 including a data center analyzer 48 configured to pre-compute the effect of modifying components in data center switch 18 prior to actually modifying the components. As described above with respect to FIG. 2, data center switch 18 includes centralized management system 26 to provide a single interface for administrator 24 to monitor and configure components in data center switch 18.

In the example illustrated in FIG. 3, management system 26 includes a primary director node 40 and a backup director node 42 that provides redundancy for management system 26. Primary director node 40 and secondary director node 42 are both connected to components of data center switch 18 via control switches 46A-46B ("control switches 46") within a virtual chassis 44. The pair of control switches 46 may also provide redundancy for management system 26. In other examples, virtual chassis 44 may include additional control switches also included in redundant pairs. The redundant director nodes 40, 42 and control switches 46 provide high availability to avoid a single point of failure for the centralized management system 26.

As described above, data center switch 18 includes distributed data and control planes across all the components in the switch. In some cases, the distributed control plane may comprise an in-band control plane network that uses the same physical links as the data plane but is logically separate from the data plane. In other cases, the distributed control plane may comprise an out-of-band control plane network that is both physically and logically separate from the data plane. In the example illustrated in FIG. 3, control switches 46 are both physically connected to each component of data center nodes 30 and data center interconnects 28 in data center switch 18. In this way, control switches 46 may provide an out-of-band control plane network for data center switch 18.

Management system 26 operates over the out-of-band control plane network provided by control switches 46. For example, primary director node 40 transmits and receives control message, such as routing and forwarding information, with data center nodes 30 and data center interconnects 28 via control switches 46. Primary director node 40 may also transmit and receive monitoring and configuration information with data center nodes 30 and data center interconnects 28 via control switches 46 using the same physical and logical connections of the control plane network.

In addition to controls switches 46, virtual chassis 44 may also include additional control and/or management applications. In the illustrated example, virtual chassis 44 includes data center analyzer 48 configured to perform the techniques of pre-computing the effect of modifying components in data center switch 18, as described in this disclosure. Data center analyzer 48 is directly connected to each component of data center nodes 30 and data center interconnects 28 in data center switch 18 in order to perform discovery operations necessary to accurately perform the pre-computing techniques.

Management system 26 includes one or more network devices with processors capable of providing a virtualized operating environment for virtual chassis 44 in which to execute control switches 46 and data center analyzer 48. In some examples, data center analyzer 48 may be executed in an operating environment of a stand-alone physical network device included in data center switch 18, such as primary director node 40. In other examples, data center analyzer 48 may be executed in either a virtualized or actual operating environment of a network device located external to data center switch 18. In that case, data center analyzer 48 may be connected to director nodes 40, 42 and/or virtual chassis 44 within management system 26 to access the components of data center switch 18.

According to the techniques described in this disclosure, data center analyzer 48 is configured to run a non-distributed copy of the traffic distribution algorithm performed in the distributed control plane of data center switch 18. In this way, data center analyzer 48 may accurately compute how the components of data center switch 18 are expected to perform given a certain topology of the switch.

Data center analyzer 48 is further configured to discover the overall topology of data center switch 18 by sending a query to each of data center nodes 30, i.e., TOR switches 34, and data center interconnects, i.e., distribution switches 32, for the current connectivity of the given component. In some cases, data center analyzer 48 may also send queries to the components for their current traffic distributions. By running the current topology through the traffic distribution algorithm, data center analyzer 48 may determine how the traffic is expected to be distributed for the current topology. Data center analyzer 48 may then compare the current traffic distribution to the expected traffic distribution for the current topology to provide the results to administrator 24 as a health check of the operation of data center switch 18.

Data center analyzer 48 may also present an editable version of the current topology to administrator 24, and receive proposed modifications to the current topology from administrator 24. In some examples, the health check may assist administrator 24 to determine which components may need to be removed, replaced or updated. Data center analyzer 48 then computes an expected traffic distribution and traffic metrics for the modified topology based on the copy of the traffic distribution algorithm and the proposed modifications. Based on the results, administrator 24 may determine whether to perform the proposed modifications to the components in data center switch 18.

In some cases, when administrator 24 allows the modifications of the components, data center analyzer 48 may also compute alternative routing paths between affected components in data center switch 18 to minimize data loss due to the removed, replaced or updated components. Data center analyzer 48 may then install the alternate routing paths in relevant components of data center switch 18 and update the traffic distribution state for data center switch 18 in accordance with the modified topology. In this way, after installation of the alternative routing paths, data center switch 18 has an operational state that ignores any components that were removed from the switch and recognizes any components that were replaced or updated.

Figure 4:
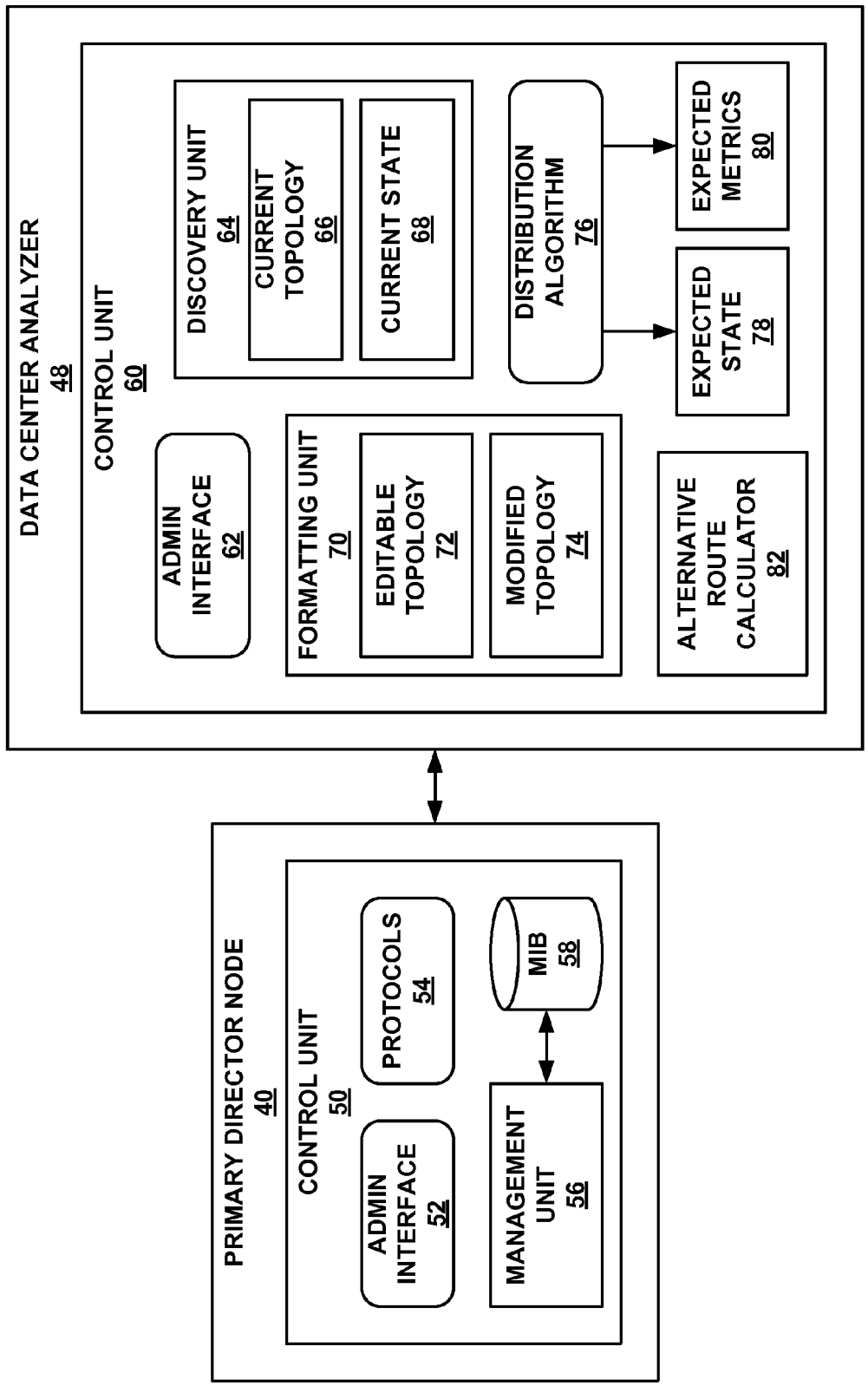
FIG. 4 is a block diagram illustrating the data center analyzer from FIG. 3 in greater detail.

FIG. 4 is a block diagram illustrating the example data center analyzer 48 from FIG. 3 in greater detail. More specifically, the example of FIG. 4 illustrates functional units of primary director node 40 and data center analyzer 48 configured to perform management plane operations. In other examples, primary director node 40 may also include one or more functional units configured to perform control plane operations. The control plane operations are described briefly below, but are not illustrated in FIG. 4.

As shown in example FIG. 4, primary director node 40 includes a control unit 50, an administrator interface 52, protocols 54, a management unit 56, and a management information base (MIB) 58. Control unit 50 of director node 40 provides an operating environment for administrator interface 52, management unit 56, and MIB 57.

Data center analyzer 48 includes a control unit 60, an administrator interface 62, a discovery unit 64 that generates a current topology 66 and a current traffic distribution state 68 of data center switch 18, a formatting unit 70 that generates an editable topology 72 and a modified topology 74, a distribution algorithm 76 that generates an expected traffic distribution state 78 and expected traffic metrics 80 for a given topology of data center switch 18, and an alternative route calculator 82. Control unit 60 of data center analyzer 48 provides an operating environment for administrator interface 62, discovery unit 64, formatting unit 70, distribution algorithm 76, and alternative route calculator 82. Primary director node 40 and data center analyzer 48 may be connected via network interfaces (not shown in FIG. 4).

Administrator 24 may interact with primary director node 40 via administrator interface 52 to monitor and configure the components in data center switch 18. Director node 40 enables administrator 24 to view data center switch 18 as a single switch by providing a single administrator interface 52 for administrator 24 to manage the components in data center switch 18. Primary director node 40 provides command line interface (CLI), simple network management protocol (SNMP), and system log functionality into data center switch 18 for configuration, management, monitoring, and provisioning by administrator 24. The single administrator interface 52 reduces by a hundredfold or more the number of components in data center switch 18 that need to be individually managed.

Administrator 24 may also interact with data center analyzer 48 via administrator interface 62 to input proposed modifications of components in data center switch 18 and receive the pre-computed effects of the proposed modifications on data center switch 18, in accordance with the techniques of this disclosure. In this way, data center analyzer 48 provides a single administrator interface 62 for administrator 24 to understand the impact of components modifications on the entire data center switch 18. Administrator interfaces 52 and 62 may each comprise one of a CLI, a user interface, or another type of interface capable of providing administrator 24 with access to the management plane of data center switch 18.

In the illustrated example, primary director node 40 operates as a network management system (NMS) to monitor and configure switches, i.e., TOR switches 34 and distribution switches 32, in the internal switching fabric of data center switch 18. In other examples, a stand-alone NMS located external to data center switch 18 may be used to manage the switches in data center switch 18 via primary director node 40. In this case, primary director node 40 may comprise a management plane proxy in data center switch 18 for the external NMS.

Within control plane 50 of primary director node 40, protocols 54 may include SNMP used by management unit 56 to monitor and/or configure the managed TOR switches 34 and distribution switches 32 in data center switch 18. As an example, management unit 56 may send configuration data or monitoring requests via SNMP messages to any of the managed components. Management unit 56 may also gather information via SNMP from each of the managed components to monitor the status of the internal switch fabric of data center switch 18. Using this information, management unit 56 may develop data describing of the physical topology of data center switch 18. Management unit 56 may also monitor faults in the internal switch fabric of data center switch 18 and collect statistics about each managed component. In this case, when administrator 24 logs into director node 40 via administrator interface 52, administrator 24 may see all the interfaces of the components in data center switch 18, as well as their traffic distribution state and metrics. Administrator 24 may use this information to manage data center switch 18 and quickly respond to problems within data center switch 18.

SNMP exposes management information for the managed components as variables to be queried or modified. The management information may be defined in MIB 58. In general, MIB 58 is a hierarchy of information that specifies objects in data center switch 18 managed by management unit 56. MIB 58 includes managed object instances that each represents an aspect of SNMP management data, which may include, for example, configuration or descriptive data for components within data center switch 18. Management unit 56 represents an exemplary instance of an SNMP management application. Administrator 24 may interact with primary director node 40 via administrator interface 52 to direct management unit 56 to manage a given network device in a specified manner, e.g., to modify the configuration of the component or to monitor the performance of the component by requesting variable information available from the management component according to MIB 58.

In some examples, primary director node 40 may also include one or more databases (not shown) that store additional data about components in data center switch 18. Examples of additional data include data describing the physical topology of data center switch 18, performance data of components in data center switch 18, services presently implemented by components in data center switch 18, and any other relevant data about the components and/or data center switch 18 not stored in MIB 58.

Further details regarding SNMP can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, and U.S. patent application Ser. No. 12/960,147, "AUTOMATIC CLASS OF SERVICE PROVISIONING FOR DATA TRANSFER WITHIN A DATA CENTER," filed Dec. 3, 2011, the entire contents of each of which are incorporated herein by reference. In some cases, management unit 56 may use configuration protocols other than SNMP to manage the components in data center switch 18.

Protocols 54 in control unit 50 of primary director node 40 may also include control protocols, such as border gateway protocol (BGP) and link state routing protocols such as intermediate system to intermediate system (IS-IS) or open shortest path first (OSPF), used by one or more routing engines running on primary director node 40 to generate a link state database, compute traffic spray weights to control distribution of traffic across links in data center switch 16 based on the link state database, and control the exchange of routes between routing engines of the components in data center switch 18. In some cases, these control plane functions may not be performed exclusively by primary director node 40, but may be distributed across all components in data center switch 18.

In some cases, administrator 24 configures the components in data center switch 18 by one of removing, replacing, updating or otherwise modifying the components. As described in this disclosure, prior to actually modifying the components in data center switch 18, data center analyzer 48 provides additional management plane operations to pre-compute the effects of the modifications. In this way, data center analyzer 48 allows administrator 24 to understand how its proposed modifications will impact the traffic distribution across connections of the components and impact traffic metrics, including traffic drops and loss in capacity and redundancy, in data center switch 18. The techniques enable administrator 24 to make an informed decision regarding whether to allow the proposed modifications to the components in data center switch 18.

Discovery unit 64 of data center analyzer 48 discovers the connectivity of the entire distributed data center switch 18. More specifically, discovery unit 64 sends a query to each of the components in data center switch 18 to request its connections to neighboring switches. Based on the responses from each of the components, discovery unit 64 generates current topology 66, which includes every physical connection between each component in data center switch 18. In some cases, current topology 66 may include non-functional components in data center switch.

As briefly described above, in some cases, director node 40 may utilize the IS-IS protocol to perform neighbor discovery between TOR switches 34 and distribution switches 32 to determine a basic topology of data center switch. This basic topology, however, does not provide sufficient detail to be used by data center analyzer 48 to pre-compute effects of modifying any component within data center switch 18.

Discovery unit 64 of data center analyzer 48 performs a finer grain topology discovery process than director node 40. For example, discovery unit 64 may send a query to each of TOR switches 34 to discover the connections between each of TOR switches 34 and distribution switches 32 on the interconnect fabric backbone. In addition, discovery unit 64 may send a query to each of TOR switches 34 to discover the connections between each of the TOR switches 34 and network devices, such as servers 20 and PE router 17 from FIG. 1, external to data center switch 18. Further, discovery unit 64 may send a query to each of distribution switches 32 to discover the connections between the front cards and rear cards within each of distribution switches 32. In some cases, when logical connections between management system 26 and components of data center switch 18 are not operational, discovery unit 64 may need to send queries to the components via console ports or telnet connections to achieve the detailed topology necessary to pre-compute the effects of modifying any component in data center switch 18.

In some cases, discovery unit 64 also discovers a current traffic distribution across the discovered connections of the components in data center switch 18. In this case, discovery unit 64 again sends a query to each of the components in data center switch 18 to request the traffic distribution across its connections to neighboring switches. As described above, the traffic distribution algorithm is executed by each of the components in the distributed control plane. Discovery unit 64 then requests the results of the traffic distribution algorithm at each of the components at a given point in time. Based on the responses from each of the components, discovery unit 64 generates current traffic distribution state 68, which includes the current spray weights for traffic across every physical connection between each component in data center switch 18.

After discovering current topology 66 and current state 68, data center analyzer 48 does not need to further interact with the components of data center switch 18 to pre-compute the effects of modifying one or more of the components. This off-line approach is possible because data center analyzer includes a non-distributed copy of traffic distribution algorithm 76. Data center analyzer 48 may use traffic distribution algorithm 76 to accurately compute how the components of data center switch 18 are expected to perform given a certain topology of the switch.

In one example, data center analyzer 48 may perform a health check on the current operation of the components in data center switch 18. Data center algorithm 48 applies distribution algorithm to current topology 66 of data center switch 18 to determine how the traffic is expected to be distributed for current topology 66. Data center algorithm 48 may then compare the expected traffic distribution state for current topology 66 with the discovered current traffic distribution state 68 for current topology 66. The comparison may identify connectivity or distribution issues with certain components in data center switch 18. In some cases, data center analyzer 48 may present the comparison to administrator 24 via administrator interface 62. Administrator 24 may use this health check for current topology 66 of data center switch 18 to determine which components may need to be removed, replaced or updated.

Formatting unit 70 of data center analyzer 48 generates an editable topology 72 for data center switch 18 based on current topology 66. Data center analyzer 48 then presents the editable topology 72 to administrator 24 via administrator interface 62. Administrator 24 may propose modifications to one or more components in data center switch 18 by modifying editable topology 72 to reflect the proposed modifications. In some cases, administrator 24 may directly modify editable topology 72 and feed modified topology 74 back to data center analyzer 48 via administrator interface 62. In other cases, administrator 24 may propose modifications to data center analyzer 48 via administrator interface 62, and formatting unit 70 may generate modified topology 74 from editable topology 72 based on the received modifications.

In some cases, editable topology 72 may also include traffic distribution information from current state 68 and/or from an expected traffic distribution state for current topology 66 determined as part of the health check discussed above. The additional traffic distribution information in editable topology 72 may assist administrator 24 in determining which components may need modification.

In order to pre-compute the effects of the proposed modifications to components in data center switch 18 received from administrator 24, data center analyzer 48 computes an expected traffic distribution state 78 for modified topology 74 based on distribution algorithm 76 and modified topology 74. Expected state 78 represents the predicted effect on the traffic distribution across connections of the components in data center switch 18 based on the proposed modifications in modified topology 74. Data center analyzer 48 may also compute expected traffic metrics 80 based on the modified topology 74 and expected state 78. Expected metrics 80 represent predicted traffic drops and predicted loss in capacity and redundancy based on the proposed modifications in modified topology 74.

As an example, if a given component is removed from data center switch 18, data center analyzer 48 is able to determine the source and destination pairs of interfaces that will be affected by the removed component using distribution algorithm 76. Based on distribution algorithm 76, data center analyzer 48 is able to know all the components and links that are used by the distributed distribution algorithm between any source and destination pair in data center switch 18. In this way, data center analyzer 48 can preemptively know what links and components will go down between a source and destination pair due to the removed component, and know what other components and links are available to create alternate routes between the source and destination pair.

Data center analyzer 48 presents expected traffic distribution state 78 and expected traffic metrics 80 to administrator 24 via administrator interface 62. Based on this information, administrator 24 can understand how the operation of data center switch 18 would be affected by the proposed modifications to one or more components of data center switch 18. Administrator 24 may then determine whether to allow the proposed modifications to the components in data center switch 18.

Alternate route calculator 82 in data center analyzer 48 may compute alternative routing paths between affected components in data center switch 18 based on modified topology 74. Alternative route calculator 82 may select the alternative routing paths to minimize the predicted traffic drops and predicted loss in capacity and redundancy of expected traffic metrics 80. In some cases, alternate route calculator 82 computes the alternative routing paths once administrator 24 allows the proposed modifications to components in data center switch 18. In other cases, alternate route calculator 82 may compute the alternative routing paths to present to administrator 24 with expected state 78 and expected metrics 80 to assist administrator 24 in determining whether to allow the proposed modifications.

When administrator 24 allows the proposed modifications to the components in data center switch 18, data center analyzer 48 may install the alternate routing paths in relevant components of data center switch 18. Data center analyzer 24 may also update the traffic distribution across connections of the affected components in data center switch 18 based on modified topology 74 and the alternate routing paths. In some cases, a manager routing engine (not shown) running on primary director node 40 may perform the alternate route installation and traffic distribution update in data center switch 18. In this way, after installation of the alternative routing paths, data center switch 18 has an operational state that ignores any components that were removed from the switch and recognizes any components that were replaced or updated.

Control unit 50 of primary director node 40 and control unit 60 of data center analyzer 48 may each include one or more processors (not shown) that execute software instructions, such as those used to define a software or computer program, stored to a computer-readable storage medium (not shown). Examples of computer-readable storage media include a storage device (e.g., a disk drive, or an optical drive), or memory (such as Flash memory, random access memory or RAM) or any other type of volatile or non-volatile memory, that stores instructions to cause a programmable processor to perform the techniques described herein. Management unit 56 of director node 40, and discovery unit 64, formatting unit 70, distribution algorithm 76, and alternative route calculator 82 of data center analyzer 60 include instructions executable by control units 50 and 60.

Alternatively, or in addition, control units 50 and 60 may each comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Figure 5:
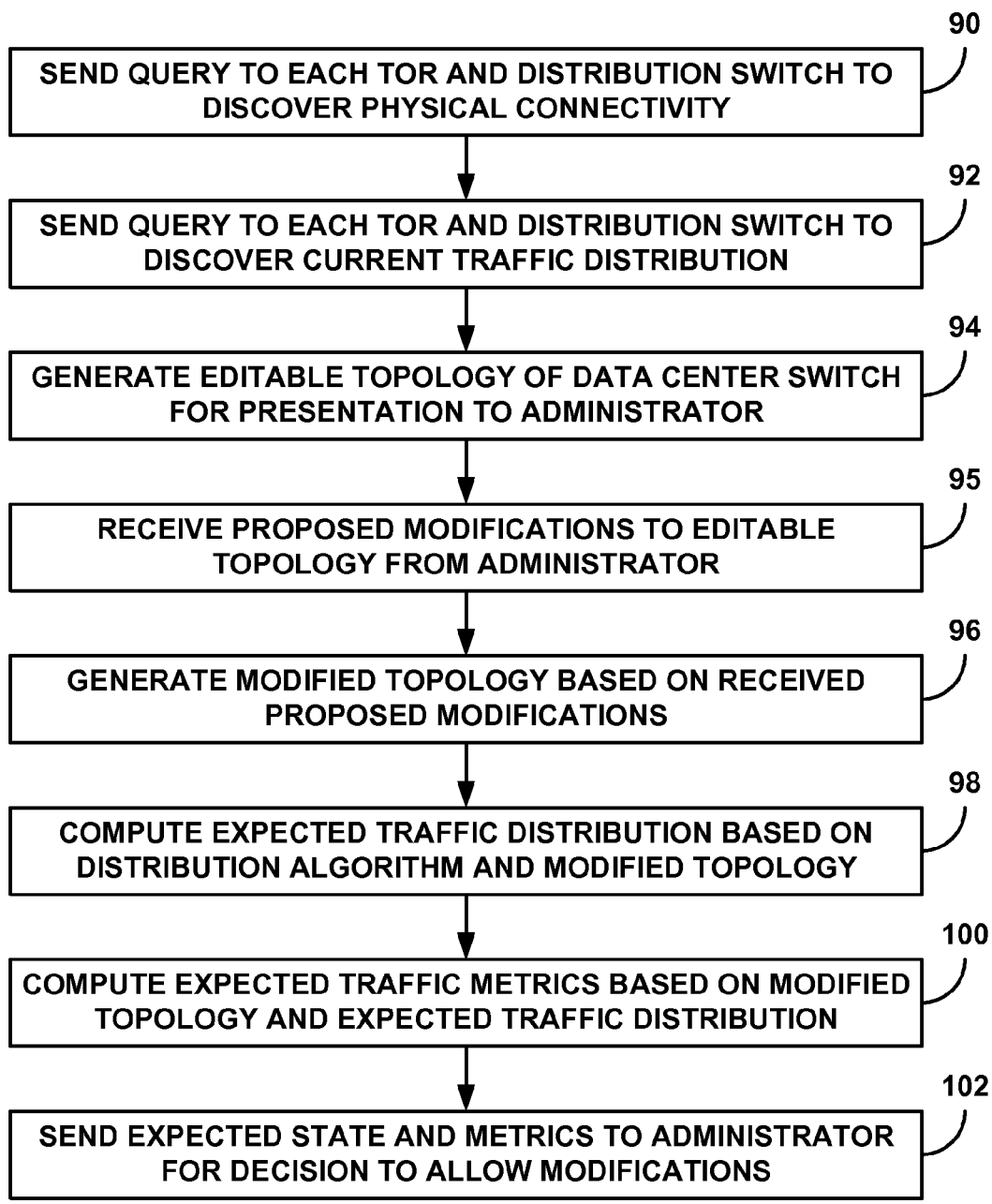
FIG. 5 is a flow chart illustrating an example operation of pre-computing the effect of modifying components in a data center switch prior to actually modifying the components.

FIG. 5 is a flow chart illustrating an example operation of pre-computing the effect of modifying components in data center switch 18 prior to actually modifying the components. The example operation is described with respect to data center analyzer 48 from FIG. 4 included in management system 26 of data center switch 18 from FIGS. 2 and 3.

Discovery unit 64 of data center analyzer 48 sends a query to each of TOR switches 34 and distribution switches 32 to discover the physical connectivity between the components of data center switch 18 (90). Discovery unit 64 also sends a query to each of TOR switches 34 and distribution switches 32 to discover the traffic distribution across the connections between TOR switches 34 and distribution switches 32 (92). Discovery unit 64 stores the discovered physical connectivity of data center switch 18 as current topology 66 and stores the discovered traffic distribution as current state 68. After discovering current topology 66 and current state 68, data center analyzer 48 does not need to further interact with the components of data center switch 18 to pre-compute the effect of disconnecting or removing one or more of the components.

Formatting unit 70 of data center analyzer 48 generates an editable topology 72 based on current topology 66 to send to administrator 24 via administrator interface 62 (94). Editable topology 72 includes the physical connectivity between TOR switches 34 and distribution switches 32, and may also include traffic distribution information across the topology. In this way, administrator 24 may be able to determine where connectivity and distribution issues are occurring in data center switch 18, and which components may need to be removed, replaced or updated. Data center analyzer 48 receives proposed modifications to editable topology 72 from administrator 24 via administrator interface 62 (95). Formatting unit 70 generates modified topology 74 based on the received proposed modifications to editable topology 72 received from administrator 24 (96).

Data center analyzer 48 then computes an expected traffic distribution state 78 for modified topology 74 based on distribution algorithm 76 and modified topology 74 (98). Distribution algorithm 76 comprises a non-distributed copy of the traffic distribution algorithm used by the components of distributed data center switch 18 to spray traffic across the connections between TOR switches 34 and distribution switches 32. Expected state 78 represents the predicted effect on the traffic distribution across connections in data center switch 18 based on the removed, replaced or updated components in modified topology 74. In addition to computing expected state 78, data center analyzer 48 also computes expected traffic metrics 80 based on modified topology 74 and expected traffic distribution state 78 (100). Expected metrics 80 represent predicted traffic drops and predicted loss in capacity and redundancy based on the removed, replaced or updated components in modified topology 74.

Data center analyzer 48 sends expected state 78 and expected metrics 80 to administrator 24 via user interface 62 for administrator 24 to decide whether to allow the modifications to the topology of data center switch 18 (102). If administrator 24 allows the modifications, alternate route calculator 82 may compute alternative routing paths between affected components in modified topology 74 of data center switch 18 to minimize the traffic drops and predicted loss in capacity and redundancy. Data center analyzer 48 may install the alternate routing paths in relevant components in data center switch 18. Data center analyzer 48 may also update traffic distribution state in data center switch 16 based on modified topology 74 and the alternate routing paths. In some cases, the alternate route installation and traffic distribution update may be performed in data center switch 18 by a manager routing engine running on primary director node 40. In this way, after installation of the alternative routing paths, data center switch 18 has an operational state that ignores any components that were removed from the switch and recognizes any components that were replaced or updated.

Various embodiments of the invention have been described. These and other embodiments are within the scope of the following claims.

The invention claimed is:

1. A method comprising:
sending, with a data center analyzer connected to a centralized management system for a data center switch, queries to components included in the data center switch to discover a current topology of the data center switch, wherein the components in the data center switch comprise a plurality of data center nodes interconnected via one or more data center interconnects, and wherein sending the queries to the components included in the data center switch comprises sending queries to the plurality of data center nodes to discover connections between each of the plurality of data center nodes and the one or more data center interconnects within the data center switch, and discover connections between each of the plurality of data center nodes and one or more network devices external to the data center switch, and sending queries to the one or more data center interconnects to discover connections within each of the one or more data center interconnects;
receiving, with the data center analyzer, proposed modifications to the current topology of the data center switch, wherein the proposed modifications to the current topology comprise proposed modifications to one or more of the components included in the data center switch;
computing an expected traffic distribution across connections of the components in a modified topology of the data center switch based on a traffic distribution algorithm and the proposed modifications; and
sending the expected traffic distribution to an administrator for a decision whether to allow the proposed modifications to the components in the data center switch.

2. The method of claim 1, further comprising sending queries to the components included in the data center switch to discover a current traffic distribution across connections of the components in the current topology.

3. The method of claim 2, further comprising sending the current topology of the data center switch with the current traffic distribution to the administrator prior to receiving the proposed modifications to the current topology from the administrator.

4. The method of claim 2, further comprising:
computing an expected current traffic distribution across the connections of the components in the current topology of the data center switch based on the traffic distribution algorithm and the current topology;
comparing the current traffic distribution for the current topology with the expected current traffic distribution for the current topology; and
sending differences between the current traffic distribution and the expected current traffic distribution to the administrator to identify issues in the data center switch.

5. The method of claim 1, further comprising generating an editable version of the current topology for the administrator of the data center switch, wherein receiving the proposed modifications to the current topology comprises receiving modifications to the editable topology from the administrator.

6. The method of claim 1, further comprising generating the modified topology of the data center switch based on the proposed modifications to the current topology received from the administrator.

7. The method of claim 1, wherein the traffic distribution algorithm comprises a non-distributed copy of a traffic distribution algorithm executed by each of the components in a distributed control plane of the data center switch.

8. The method of claim 1, further comprising computing expected traffic metrics based on the modified topology of the data center switch and the expected traffic distribution, wherein the expected traffic metrics include one or more of predicted traffic drops, predicted loss in capacity, and predicted loss in redundancy for the modified topology of the data center switch.

9. The method of claim 1, further comprising, when the administrator allows the proposed modifications to the components of the data center switch, automatically calculating, with a routing protocol executing on the data center analyzer within the centralized management system for the data center switch, alternative routing paths between affected components in the data center switch.

10. The method of claim 9, further comprising installing the alternative routing paths in relevant components in the data center switch.

11. The method of claim 9, further comprising updating the traffic distribution across connections of the components in the data center switch based on the modified topology and the alternative routing paths.

12. The method of claim 1, wherein the data center switch comprises a single tier data center switching fabric.

13. The method of claim 1, wherein the data center analyzer is executed by a processor within the centralized management system for the data center switch.

14. The network device of claim 1, wherein the data center analyzer is executed by a processor external to the centralized management system for the data center switch.

15. A network device comprising:
a connection to a centralized management system for a data center switch; and
a processor configured to execute a data center analyzer to:
send queries to components of the data center switch to discover a current topology of the data center switch, wherein the components in the data center switch comprise a plurality of data center nodes interconnected via one or more data center interconnects, and wherein the processor is further configured to send queries to the plurality of data center nodes to discover connections between each of the plurality of data center nodes and the one or more data center interconnects within the data center switch, and discover connections between each of the plurality of data center nodes and one or more network devices external to the data center switch, and send queries to the one or more data center interconnects to discover connections within each of the one or more data center interconnects,
receive proposed modifications to the current topology of the data center switch, wherein the proposed modifications to the current topology comprise proposed modifications to one or more of the components included in the data center switch,
compute an expected traffic distribution across connections of the components in a modified topology of the data center switch based on a traffic distribution algorithm and the proposed modifications, and
send the expected traffic distribution to an administrator for a decision whether to allow the proposed modifications to the components in the data center switch.

16. The network device of claim 15, wherein the processor is configured to send queries to the components included in the data center switch to discover a current traffic distribution across connections of the components in the current topology.

17. The network device of claim 16, wherein the processor is configured to send the current topology of the data center switch with the current traffic distribution to the administrator prior to receiving the proposed modifications to the current topology from the administrator.

18. The network device of claim 16, wherein the processor is configured to:
compute an expected current traffic distribution across the connections of the components in the current topology of the data center switch based on the traffic distribution algorithm and the current topology;
compare the current traffic distribution for the current topology with the expected current traffic distribution for the current topology; and
send differences between the current traffic distribution and the expected current traffic distribution to the administrator to identify issues in the data center switch.

19. The network device of claim 15, wherein the processor is configured to generate an editable version of the current topology for the administrator of the data center switch, and receive the proposed modifications to the current topology as modifications to the editable topology from the administrator.

20. The network device of claim 15, wherein the processor is configured to generate the modified topology of the data center switch based on the proposed modifications to the current topology received from the administrator.

21. The network device of claim 15, wherein the traffic distribution algorithm comprises a non-distributed copy of a traffic distribution algorithm executed by each of the components in a distributed control plane of the data center switch.

22. The network device of claim 15, wherein the processor is configured to compute expected traffic metrics based on the modified topology of the data center switch and the expected traffic distribution, wherein the expected traffic metrics include one or more of predicted traffic drops, predicted loss in capacity, and predicted loss in redundancy for the modified topology of the data center switch.

23. The network device of claim 15, wherein, when the administrator allows the proposed modifications to the components of the data center switch, the processor is configured to automatically calculate, with a routing protocol executing on the data center analyzer executed by the processor, alternative routing paths between affected components in the data center switch.

24. The network device of claim 23, wherein the processor is configured to install the alternative routing paths in relevant components in the data center switch.

25. The network device of claim 23, wherein the processor is configured to update the traffic distribution across connections of the components in the data center switch based on the modified topology and the alternative routing paths.

26. The network device of claim 15, wherein the data center switch comprises a single tier data center switching fabric.

27. The network device of claim 15, wherein the processor executes the data center analyzer within the centralized management system for the data center switch.

28. The network device of claim 15, wherein the processor executes the data center analyzer external to the centralized management system for the data center switch.

29. A non-transitory computer-readable medium comprising instructions that when executed cause one or more processors to:
send, with a data center analyzer connected to a centralized management system for a data center switch, queries to components included in the data center switch to discover a current topology of the data center switch, wherein the components in the data center switch comprise a plurality of data center nodes interconnected via one or more data center interconnects, and wherein the instructions cause the one or more processors to send queries to the plurality of data center nodes to discover connections between each of the plurality of data center nodes and the one or more data center interconnects within the data center switch, and discover connections between each of the plurality of data center nodes and one or more network devices external to the data center switch, and send queries to the one or more data center interconnects to discover connections within each of the one or more data center interconnects;

receive proposed modifications to the current topology of the data center switch, wherein the proposed modifications to the current topology comprise proposed modifications to one or more of the components included in the data center switch;

compute an expected traffic distribution across connections of the components in a modified topology of the data center switch based on a traffic distribution algorithm and the proposed modifications; and send the expected traffic distribution to an administrator for a decision whether to allow the proposed modifications to the components in the data center switch.

30. A system comprising:

a data center switch including a plurality of components and a centralized management system, wherein the plurality of components in the data center switch comprise a plurality of data center nodes interconnected via one or more data center interconnects; and a data center analyzer connected to the centralized management system for the data center switch, the data center analyzer configured to:

send queries to the components included in the data center switch to discover a current topology of the data center switch, wherein the data center analyzer is further configured to send queries to the plurality of data center nodes to discover connections between each of the plurality of data center nodes and the one or more data center interconnects within the data center switch, and discover connections between each of the plurality of data center nodes and one or more network devices external to the data center switch, and send queries to the one or more data center interconnects to discover connections within each of the one or more data center interconnects, receive proposed modifications to the current topology of the data center switch, wherein the proposed modifications to the current topology comprise proposed modifications to one or more of the components included in the data center switch, compute an expected traffic distribution across connections of the components in a modified topology of the data center switch based on a traffic distribution algorithm and the proposed modifications, and send the expected traffic distribution to an administrator for a decision whether to allow the proposed modifications to the components in the data center switch.

\* \* \* \* \*